(12) United States Patent
Zhang et al.

(10) Patent No.: US 10,035,589 B2
(45) Date of Patent: Jul. 31, 2018

(54) FOLDABLE DRONE

(71) Applicant: BEIJING ZERO ZERO INFINITY TECHNOLOGY CO., LTD, Beijing (CN)

(72) Inventors: Tong Zhang, Beijing (CN); Mengqiu Wang, Beijing (CN); Zhaozhe Wang, Beijing (CN); Xuyang Zhang, Beijing (CN); Guanqun Zhang, Beijing (CN); Shuang Gong, Beijing (CN); Yalin Zhang, Beijing (CN); Jinglong Wang, Beijing (CN); Lixin Liu, Beijing (CN)

(73) Assignee: Beijing Zero Zero Infinity Technology Co., Ltd, Beijing (CN)

( * ) Notice: Subject to any disclaimer, the term of this patent is extended or adjusted under 35 U.S.C. 154(b) by 149 days.

(21) Appl. No.: 15/035,934

(22) PCT Filed: Dec. 29, 2015

(86) PCT No.: PCT/CN2015/099327
§ 371 (c)(1),
(2) Date: May 11, 2016

(87) PCT Pub. No.: WO2016/107528
PCT Pub. Date: Jul. 7, 2016

(65) Prior Publication Data
US 2016/0340021 A1    Nov. 24, 2016

Related U.S. Application Data

(60) Provisional application No. 62/099,512, filed on Jan. 4, 2015.

(30) Foreign Application Priority Data

Aug. 4, 2015   (CN) ........................... 2015 1 0472369

(51) Int. Cl.
*B64C 27/08*     (2006.01)
*B64C 27/00*     (2006.01)
(Continued)

(52) U.S. Cl.
CPC .............. *B64C 27/006* (2013.01); *B64C 1/30* (2013.01); *B64C 27/08* (2013.01); *B64C 39/024* (2013.01);
(Continued)

(58) Field of Classification Search
CPC . B64C 1/30; B64C 29/0025; B64C 2201/027; B64C 2201/128;
(Continued)

(56) References Cited

U.S. PATENT DOCUMENTS 5,419,514 A * 5/1995 Ducan ................. B64C 29/0033
244/12.4
5,890,441 A * 4/1999 Swinson ............. B64C 29/0025
244/12.1
(Continued)

FOREIGN PATENT DOCUMENTS

CN    101973390 A    2/2011
CN    202414160 U    9/2012
(Continued)

OTHER PUBLICATIONS

International Search Report dated Apr. 5, 2016, PCT Application No. PCT/CN2015/099327.
(Continued)

*Primary Examiner* — Medhat Badawi
(74) *Attorney, Agent, or Firm* — Jeffrey Schox; Diana Lin

(57) ABSTRACT

A foldable drone is provided to improve the portability of the drone, which includes a drone body and a rotary wing part connected to the drone body. The rotary wing part includes a first rotary wing module and a second rotary wing module
(Continued)

with each having at least one rotary wing, and the first rotary wing module and the second rotary wing module are respectively articulated to two sides of the drone body, to allow the first rotary wing module and the second rotary wing module to rotate about their respective articulating shafts, so as to be folded or unfolded.

17 Claims, 4 Drawing Sheets

(51) Int. Cl.
  *B64C 1/30* (2006.01)
  *B64C 39/02* (2006.01)

(52) U.S. Cl.
  CPC .. *B64C 2201/027* (2013.01); *B64C 2201/042* (2013.01); *B64C 2201/108* (2013.01); *B64C 2201/20* (2013.01); *B64C 2201/201* (2013.01)

(58) Field of Classification Search
  CPC ........ B64C 2201/162; B64C 2201/044; B64C 2201/042; B64C 2201/108; B64C 2201/20; B64C 2201/201; B64C 27/006; B64C 27/08; B64C 39/024; B64D 35/06
  See application file for complete search history.

(56) References Cited

U.S. PATENT DOCUMENTS

| | | | | |
|---|---|---|---|---|
| 6,260,796 B1* | 7/2001 | Klingensmith | ......... | B64C 27/08 244/17.11 |
| 6,293,491 B1* | 9/2001 | Wobben | .................. | B64C 27/00 244/17.23 |
| 6,547,180 B1* | 4/2003 | Cassidy | ................. | B64C 15/00 244/12.5 |
| 6,745,977 B1* | 6/2004 | Long | .......................... | B60F 5/02 244/17.25 |
| 6,773,321 B1* | 8/2004 | Urquiaga | ............... | A63H 17/28 446/454 |
| 6,824,095 B2* | 11/2004 | Mao | ........................ | B64C 37/00 244/12.5 |
| 6,840,480 B2* | 1/2005 | Carroll | .................. | B64C 39/024 244/117 R |
| 6,843,447 B2* | 1/2005 | Morgan | .............. | B64C 29/0025 244/12.3 |
| 7,011,274 B1* | 3/2006 | Hardoin | ................. | B64D 35/00 244/12.4 |
| 7,090,164 B2* | 8/2006 | Akaro | .................... | B64C 27/08 244/17.23 |
| 7,159,817 B2* | 1/2007 | VanderMey | ........ | B64C 29/0016 244/12.1 |
| 7,306,186 B2* | 12/2007 | Kusic | ...................... | B64C 27/08 244/17.23 |
| 7,334,755 B2* | 2/2008 | Svoboda, Jr. | ........... | B64C 27/08 244/17.23 |
| 7,490,572 B2* | 2/2009 | Grober | .................... | B60R 11/04 114/191 |
| 7,540,450 B2* | 6/2009 | Brand | .................... | B64D 27/14 244/54 |
| 8,052,081 B2* | 11/2011 | Olm | ..................... | B64C 39/024 244/17.23 |
| 8,695,919 B2* | 4/2014 | Shachor | ................ | B64C 39/022 244/17.11 |
| 8,774,982 B2* | 7/2014 | Oakley | .................. | B64C 27/08 244/17.23 |
| 8,876,039 B2* | 11/2014 | Lubenow | .............. | B64C 39/024 244/3.28 |
| 9,004,396 B1* | 4/2015 | Colin | ..................... | B64D 47/08 244/17.23 |
| 9,051,050 B2* | 6/2015 | Achtelik | ................. | B64C 27/08 |
| 9,550,567 B1* | 1/2017 | Erdozain, Jr. | .......... | B64C 29/02 |
| 9,573,683 B2* | 2/2017 | Martin | ..................... | B64C 27/50 |
| 2006/0192046 A1* | 8/2006 | Heath | ..................... | B64C 15/14 244/12.3 |
| 2007/0057113 A1* | 3/2007 | Parks | ..................... | B64C 15/00 244/12.5 |
| 2008/0048065 A1* | 2/2008 | Kuntz | .................... | A63H 17/00 244/17.23 |
| 2008/0054121 A1* | 3/2008 | Yoeli | ...................... | B64C 1/1415 244/12.1 |
| 2009/0008499 A1* | 1/2009 | Shaw | ..................... | B64C 27/20 244/17.23 |
| 2010/0051741 A1* | 3/2010 | Ismailov | ............... | B64C 39/024 244/13 |
| 2013/0146716 A1* | 6/2013 | Gettinger | .................. | B64C 3/56 244/215 |
| 2014/0026802 A1* | 1/2014 | Parks | ........................ | B60F 5/02 114/313 |
| 2014/0061362 A1* | 3/2014 | Olm | .......................... | B60F 5/02 244/2 |
| 2014/0061376 A1* | 3/2014 | Fisher | ...................... | B60K 1/00 244/62 |
| 2014/0246545 A1* | 9/2014 | Markov | .................. | B64D 1/16 244/190 |
| 2015/0122950 A1* | 5/2015 | Markov | .................. | B64D 1/16 244/190 |
| 2016/0144954 A1* | 5/2016 | Daigle | .................. | B64C 39/024 244/17.23 |
| 2016/0152316 A1* | 6/2016 | Wang | .................... | B64C 39/028 244/120 |
| 2017/0217585 A1* | 8/2017 | Hulsman | ................. | B64C 29/02 |
| 2017/0225783 A1* | 8/2017 | Fisher | .................... | B64C 39/024 |
| 2017/0291697 A1* | 10/2017 | Kornatowski | ........ | B64C 27/006 |
| 2017/0297707 A1* | 10/2017 | Rollefstad | ............. | B64C 39/024 |
| 2017/0313418 A1* | 11/2017 | Yoon | ..................... | B64C 39/024 |
| 2017/0322563 A1* | 11/2017 | Kohstall | .................. | G05D 1/12 |

FOREIGN PATENT DOCUMENTS

| | | |
|---|---|---|
| CN | 202935577 U | 5/2013 |
| CN | 103332291 | 10/2013 |
| CN | 203461110 U | 3/2014 |
| CN | 103921933 A | 7/2014 |
| CN | 103979107 | 8/2014 |
| CN | 203829646 U | 9/2014 |
| CN | 204056294 U | 12/2014 |
| CN | 104443411 A | 3/2015 |
| CN | 104743104 A | 7/2015 |
| CN | 204502398 U | 7/2015 |
| CN | 204998752 | 1/2016 |
| CN | 205113731 U | 3/2016 |
| KR | 20120136797 A | 12/2012 |
| WO | WO2006/112578 A1 | 10/2006 |

OTHER PUBLICATIONS

Canadian Patent Application No. CA2677508, published Mar. 3, 2010.
Office Action dated Nov. 3, 2016 in Chinese Patent Application No. 201510472369.7, with English language summary.
English Abstract of CN101973390A published Feb. 16, 2011.
English Abstract of CN103921933A published Jul. 16, 2014.
English Abstract of CN202414160U published Sep. 5, 2012.
English Abstract of CN203461110U published Mar. 5, 2014.
English Abstract of CN204056294U published Dec. 31, 2014.

* cited by examiner

FOLDABLE DRONE

This application is the national phase of International Application No. PCT/CN2015/099327, titled "FOLDABLE DRONE", filed on Dec. 29, 2015, which claims the benefit of priorities to U.S. patent application Ser. No. 62/099,512 titled "FOLDABLE DRONE WITH FULLY PROTECTED PROPELLER GUARD SYSTEM", filed with the United States Patent and Trademark Office on Jan. 4, 2015, and Chinese Patent Application No. 201510472369.7 titled "FOLDABLE DRONE", filed with the Chinese State Intellectual Property Office on Aug. 4, 2015, the entire disclosures of which applications are incorporated herein by reference.

FIELD

The present application relates to the technical field of drones, and particularly to a foldable drone.

BACKGROUND

Unmanned aerial vehicle, referred to as drone, is an unmanned air vehicle controlled either by a wireless remote control equipment or by its own program control device. The drone was first developed in 1940's, and was used as a target craft in military training at that time. The drone has a wide application, a low cost, and a high cost effectiveness ratio. The drone has no risk of causing human injuries, a strong viability and a great maneuvering performance, and is easy to use. Thus, the drone not only plays an extremely important role in modern warfare, but also has a broad prospect in civilian field. At present, drones are widely used in fields such as guard, urban management, agriculture, geology, meteorology, power, emergency rescue and disaster relief, and video capture.

In the conventional technology, some drones with a fixed wing may have only one rotary wing, and some helicopter type drones may have two or more rotary wings. According to the mechanical features of the rotary wing, each rotary wing rotates to cause ambient airflow to change, thus generating a lift force. Thus, each rotary wing needs to correspond to a certain independent space, in order to create condition for generating the lift force. That is to say, in solutions of the conventional drone, the rotary wing occupies most part of a cross section of the drone, and also causes inconvenience to carrying of the drone.

Therefore, a technical issue to be addressed presently by those skilled in the art is to design a foldable drone, which can be folded up when not in use, to improve the portability of the drone.

SUMMARY

An object of the present application is to provide a foldable drone, to improve the portability of the drone.

In order to address the above technical issues, a foldable drone is provided according to the present application, which includes a drone body and a rotary wing part connected to the drone body, wherein the rotary wing part includes a first rotary wing module and a second rotary wing module with each having at least one rotary wing, and the first rotary wing module and the second rotary wing module are respectively articulated to two sides of the drone body, to allow the first rotary wing module and the second rotary wing module to rotate about their respective articulating shafts thus being folded or unfolded.

The drone according to the present application includes a drone body and a rotary wing part, specifically, the rotary wing part includes the first rotary wing module and the second rotary wing module, both of which are respectively articulated to two sides of the drone body, and the first rotary wing module and the second rotary wing module may rotate about their respective articulating shafts, to allow the first rotary wing module and the second rotary wing module to be folded, thereby folding up the drone, and facilitating carrying of the drone. When the drone is required to be used, the first rotary wing module and the second rotary wing module may be unfolded, and in this case, the both rotary wing modules respectively have relatively independent spaces, to allow lift forces to be generated by the rotation of the rotary wings, thus allowing the drone to be in a flying state.

Thus, the rotary wings of the drone according to the present application is performed with modular design, and two rotary wing modules which can be folded to be overlapped or unfolded are firstly formed, and then folding and unfolding are achieved by the turning and rotation of the rotary wing module, to change the state of the drone, thus meeting the requirements for folding and flying of the drone, and improving the portability of the drone. Furthermore, lines and control modules required by the drone may all be built in the drone body, without being required to be separately disposed in the various rotary wing modules, thus improving the reliability of the control, and improving the integrity of the drone, and simplifying the structure of the rotary wing to a certain extent.

Optionally, first positioning members in cooperation with each other are provided on surfaces, facing towards each other, of the first rotary wing module and the second rotary wing module, to allow the first rotary wing module and the second rotary wing module to be fixed to each other by the first positioning members when the first rotary wing module and the second rotary wing module are folded.

Optionally, second positioning members in cooperation with each other are provided on surfaces, facing towards each other, of the first rotary wing module and the drone body, and/or second positioning members in cooperation with each other are provided on surfaces, facing towards each other, of the second rotary wing module and the drone body, to allow the first rotary wing module and the second rotary wing module to be fixed to the drone body by the second positioning members in the case that the first rotary wing module and the second rotary wing module are unfolded.

Optionally, the first rotary wing module and the second rotary wing module can be unfolded into the same plane; and/or, the first rotary wing module and the second rotary wing module can be unfolded into the same plane as the drone body, or the plane formed by the first rotary wing module and the second rotary wing module unfolded is in parallel with one surface of the drone body.

Optionally, a vertical cross section of the drone body is of a T shape, and the articulating shaft extends from two ends of a vertical portion of the T shape, to form connecting ends for connecting the first rotary wing module or the second rotary wing module; and the first rotary wing module and the second rotary wing module are in parallel with and fit a transverse portion of the T shape when the first rotary wing module and the second rotary wing module are unfolded.

Optionally, in the case that the first rotary wing module and the second rotary wing module are folded, outer side surfaces of the first rotary wing module and the second rotary wing module are both not beyond outer side surfaces of the drone body.

Optionally, the first rotary wing module is provided with a first gear, and the second rotary wing module is provided with a second gear engaged with the first gear, axes of the first gear and the second gear are respectively parallel to the respective articulating shafts on the same sides as the first gear and the second gear.

Optionally, the two articulating shafts are arranged in the drone body, and the first gear and the second gear are respectively sleeved on and articulated to the respective articulating shafts on the same sides as the first gear and the second gear.

Optionally, each of the first rotary wing module and the second rotary wing module includes at least two rotary wings connected to each other, and the rotary wings are arranged linearly.

Optionally, in the first rotary wing module and the second rotary wing module, two adjacent rotary wings are articulated, and one of the rotary wings constitutes a basic rotary wing, and other rotary wings constitute folding rotary wings, the first rotary wing module and the second rotary wing module are articulated to the drone body via the basic rotary wing; and the folding rotary wings can be folded to the basic rotary wing sequentially, or unfolded from the basic rotary wing sequentially.

Figure 1:
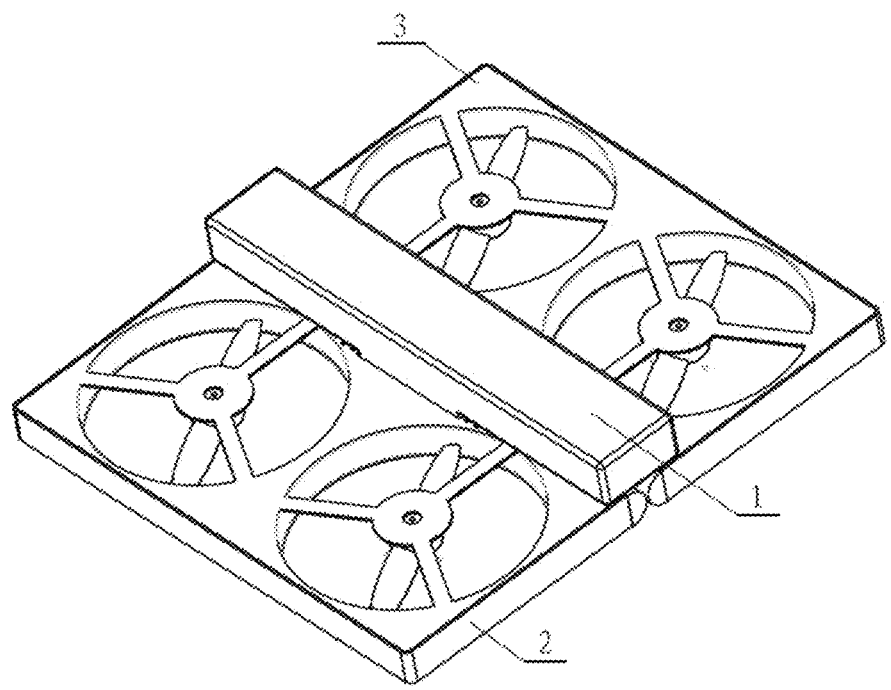
FIG. 1 is a perspective schematic view showing the structure of a foldable drone according to an embodiment of the present application in an unfolded state.

Reference numerals in FIGS. 1 to 6:

| | | | |
|---|---|---|---|
| 1. | drone body, | 2. | first rotary wing module, |
| 3. | second rotary wing module, | 4. | articulating shaft, |
| 41. | connecting end, | 5. | first positioning member, |
| 6. | second positioning member, | 7. | first gear, |
| 8. | second gear, and | 9. | threaded hole. |

DETAILED DESCRIPTION

A core of the present application is to provide a foldable drone, which can improve the portability of the drone.

It should be noted that, terms such as "first", "second" and the like in the present application are only intended to distinguish multiple components or structures having the same or similar structures, rather than to particularly limit the arrangement order or connection relationship.

A drone according to the present application is described in detail hereinafter in conjunction with drawings, to help those skilled in the art to accurately understand the technical solutions of the present application.

As shown in FIGS. 1 to 6, a foldable drone is provided according to the present application, which includes a drone body 1 and a rotary wing part connected to the drone body 1. Specifically, the rotary wing part includes a first rotary wing module 2 and a second rotary wing module 3. Each of the first rotary wing module 2 and the second rotary wing module 3 includes at least one rotary wing, namely, the drone according to the present application may include more than two rotary wings. The first rotary wing module 2 and the second rotary wing module 3 are articulated to both sides of the drone body 1 respectively, and each of the first rotary wing module 2 and the second rotary wing module 3 is rotatable about its own articulating shaft 4, to allow both of the rotary wing modules to get close to each other to be folded or to be away from each other to be unfolded.

Apparently, the numbers of the rotary wings included in the first rotary wing module 2 and the second rotary wing module 3 may be the same or different, that is to say, the drone according to the present application includes at least two rotary wings. The specific number of the rotary wings may be an odd number or an even number, and may be set according to use requirements. It should be understood that, in the case that the numbers of the first rotary wing modules 2 and the second rotary wing modules 3 are the same, the first rotary wing modules 2 and the second rotary wing modules 3 can be completely folded, thus improving the stability of the folded drone. Also, the first rotary wing module 2 and the second rotary wing module 3 may be arranged symmetrically with respect to the drone body 1, to allow both of the rotary wing modules to form a drone having a symmetrical structure in the case that both of the rotary wing modules are unfolded, thus further improving a flying stability.

It should be noted that, the embodiments shown in FIGS. 1 to 6 are illustrated taken the rotary wing part including four rotary wings as an example, that is, each of the first rotary wing module 2 and the second rotary wing module 3 includes two rotary wings, and the two rotary wings are formed integrally or are connected sequentially. The first rotary wing module 2 and the second rotary wing module 3 are arranged symmetrically with respect to the drone body 1, namely, each of the drones shown in FIGS. 1 to 6 is a drone having four rotary wings. However, it should be appreciated by those skilled in the art that, the drone according to the present application is not limited to the structure having four rotary wings, and the number and arrangement manner of the rotary wings may be set as required. FIGS. 1 to 6 only show one specific form of the present application, which is configured to interpret the structure of the drone according to the present application, and should not be interpreted as a limitation to the present application.

As described hereinabove, the drone according to the present application includes the drone body 1 and the rotary wing part. Specifically, the rotary wing part includes the first rotary wing module 2 and the second rotary wing module 3, both of which are respectively articulated to two sides of the drone body 1, and are rotatable about their respective articulating shafts 4, thus allowing the first rotary wing module 2 and the second rotary wing module 3 to be folded to fold up the drone, or allowing the first rotary wing module 2 and the second rotary wing module 3 to be away from each other to unfold the drone. Thus, the drone according to the present application may achieve a shape change to be folded to be carried or to be unfolded to be directly used, which has a high service efficiency, and a good portability, reduces the space occupied by the drone to a large degree when the drone is folded, and may not adversely affect the normal use of the drone. In addition, the drone body 1 may be configured to internally installed with components such as various control modules and a power source, and drivers of various rotary wings may be integrated and then are built in the drone body 1, which not only improves the integrity and controllability of the drone, but also facilitates simplifying the structure of the rotary wing. In addition, the arrangement of the first rotary wing module 2 and the second rotary wing module 3 allows the relative movement of the rotary wings to be simple and reliable, there is no need to provide a folding component separately for each of the rotary wings or provide foldable rotary wings, thereby simplifying and facilitating the folding and unfolding of the drone.

In order to describe easily, surfaces, facing towards each other, of the first rotary wing module 2 and the second rotary wing module 3 when the first rotary wing module 2 and the second rotary wing module 3 are folded are defined as inner surfaces of the first rotary wing module 2 and the second rotary wing module 3, and surfaces opposite to the inner surfaces are outer surfaces of the first rotary wing module 2 and the second rotary wing module 3. Extending directions of the articulating shaft 4 are taken as front and rear directions, accordingly in a plane parallel to the inner surfaces and the outer surfaces, directions perpendicular to the front and rear directions are defined as left and right directions.

As shown in FIG. 1, in the case that the first rotary wing module 2 and the second rotary wing module 3 are in an unfolded state, the two rotary wing modules may be in the same plane, to form an aircraft having a planar structure. In this case, since the first rotary wing module 2 and the second rotary wing module 3 extend in the same plane, and there is no overlapped area, which ensures the independence of spaces occupied by the rotary wings respectively, increases a contact area of the rotary wing with airflow, and can prevent airflows surrounding the rotary wings from interfering with each other, thus further generating a sufficient lift force.

Furthermore, the first rotary wing module 2 and the second rotary wing module 3 may be in parallel with one surface of the drone body 1 when the first rotary wing module 2 and the second rotary wing module 3 are unfolded. As shown in FIG. 1, the first rotary wing module 2 and the second rotary wing module 3 may both be mounted to one surface of the drone body 1, in this case, this surface functions as a mounting surface, and the outer surfaces of the first rotary wing module 2 and the second rotary wing module 3 may both be in parallel with the mounting surface. Besides, the first rotary wing module 2 and the second rotary wing module 3 may be spliced to form a plate-shaped structure, and the drone body 1 is located on an outer surface of the plate structure. Thus in use, the inner surfaces of the first rotary wing module 2 and the second rotary wing module 3 may face downward, to allow the rotary wings to be sufficiently in contact with the airflow, to generate a sufficient lift force, and prevent the drone body 1 from adversely affecting the lifting. That is to say, the first rotary wing module 2 and the second rotary wing module 3 may both be mounted on one surface of the drone body 1, and the first rotary wing module 2 and the second rotary wing module 3 may be in parallel with the mounting surface when being unfolded, thus improving the flatness of the drone, and thereby reducing the resistance during flying.

The structures of the first rotary wing module 2, the second rotary wing module 3 and the drone body 1 may be further improved, to allow the drone body 1 to be located between the first rotary wing module 2 and the second rotary wing module 3. Thus, the first rotary wing module 2 and the second rotary wing module 3 may be in the same plane as the drone body 1 when being unfolded. That is, the first rotary wing module 2, the second rotary wing module 3, and the drone body 1 form a plate structure together, to allow the entire drone to fly as the plate structure, and to further simplify the structure of the drone, and reduce the resistance during flying.

Those skilled in the art may employ various forms to implement the above structural improvement. For example, the first rotary wing module 2 and the second rotary wing module 3 may be respectively articulated to two side surfaces of the drone body 1, namely, a left side surface and a right side surface of the drone body 1 in FIG. 1, and the drone body 1, the first rotary wing module 2 and the second rotary wing module 3 are configured to have a same thickness, thus the first rotary wing module 2 and the second rotary wing module 3 may be in the same plane as the drone body 1 when being unfolded. Or, the structure of the drone body 1 may be improved, and grooves for mounting the first rotary wing module 2 and the second rotary wing module 3 may be processed in one surface of the drone body 1, to realize an embedded mounting of the first rotary wing module 2 and the second rotary wing module 3, and to allow the first rotary wing module 2 and the second rotary wing module 3 to be in the same plane as the drone body 1 when the first rotary wing module 2 and the second rotary wing module 3 are unfolded.

Figure 2:
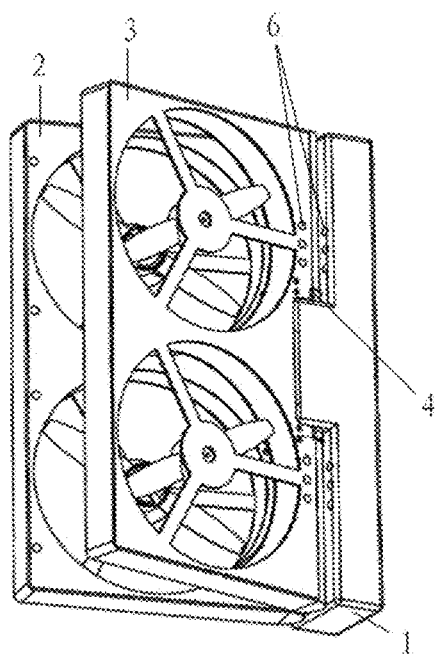
FIG. 2 is a side schematic view showing the structure of the foldable drone in FIG. 1 in a partially folded state.

As shown in FIG. 2, second positioning members 6 in cooperation with each other may be provided on surfaces, facing towards each other, of the first rotary wing module 2 and the drone body 1 respectively, and second positioning members 6 may also be provided on surfaces, facing towards each other, of the second rotary wing module 3 and the drone body 1. The first rotary wing module 2 and the second rotary wing module 3 may be fixed to the drone body 1 by the second positioning members 6 when the first rotary wing module 2 and the second rotary wing module 3 are unfolded. In the case that the first rotary wing module 2 and the second rotary wing module 3 are mounted on the mounting surface of the drone body 1, the surfaces facing towards each other may specifically refer to the outer surface of the first rotary wing module 2 and the mounting surface, and, the outer surface of the second rotary wing module 3 and the mounting surface. In the case that the first rotary wing module 2 and the second rotary wing module 3 are mounted on the left side surface and the right side surface of the drone body 1 respectively, the surfaces facing towards each other refer to a side surface of the first rotary wing module 2 and a side surface of the drone body 1 on the side corresponding to the first rotary wing module 2, and, a side surface of the second rotary wing module 3 and a side surface of the drone body 1 on the side corresponding to the second rotary wing module 3.

The second positioning members 6 may be embodied as magnets which can be attracted to each other, as shown in FIG. 2. The first rotary wing module 2 and the second rotary wing module 3 may be arranged on one surface of the drone body 1, and this surface is used as a mounting surface. The outer surfaces of the first rotary wing module 2 and the second rotary wing module 3 may be provided with the magnets, and the mounting surface of the drone body 1 may also be provided with magnets at corresponding positions. When the first rotary wing module 2 and the second rotary wing module 3 are unfolded, the magnets are attracted to each other, thus achieving a fixed connection between the first rotary wing module 2 and the drone body 1, and a fixed connection between the second rotary wing module 3 and the drone body 1. When the magnets are employed as the second positioning members 6, and when the first rotary wing module 2 and the second rotary wing module 3 are required to be folded, a small external force may be applied to overcome an attracting force of the magnets, thus the first rotary wing module 2 and the second rotary wing module 3 may be driven to rotate about their respective articulating shafts, and further are folded, thus the operation is simple and convenient.

It should be appreciated that, the second positioning members 6 may be of various structural forms, and may not be limited to the specific form of the magnets described above. For example, the drone body 1 may be provided with a track, and then the first rotary wing module 2 and the second rotary wing module 3 may each be provided with a movable member in cooperation with the track, and a position-limiting member, such as a buckle, may be provided on the track at an initial position or at any positions where positioning is required. In the case that the first rotary wing module 2 and the second rotary wing module 3 rotate about their respective articulating shafts 4, the movable member moves along the track, and when the first rotary wing module 2 and the second rotary wing module 3 rotate to a position where positioning is required, the movement of the movable member may be limited by the position-limiting member, thus achieving the positioning of the first rotary wing module 2 and the second rotary wing module 3 at this position, and in this case, the movable member, the track, and the position-limiting member together form the second positioning members 6. Or the second positioning members 6 may also be embodied in a form of a snap and a spring in cooperation with each other, thus when positioning is not required, the snap is fixed by the spring, and may not have an effect on the first rotary wing module 2 and the second rotary wing module 3; and when the first rotary wing module 2 and the second rotary wing module 3 move to any position where the first rotary wing module 2 and the second rotary wing module 3 are required to be fixed to the drone body 1, the spring may be triggered to spring out the snap, to fasten the first rotary wing module 2 and the second rotary wing module 3, thus fixing the first rotary wing module 2 and the second rotary wing module 3 to that position. A tension spring may further be provided between the first rotary wing module 2 and the drone body 1, and a tension spring may further be provided between the second rotary wing module 3 and the drone body 1, and the positioning is achieved by the tensioning force of the tension springs. That is, the second positioning members 6 may be tension springs. Or the second positioning members 6 may be fixing clamps, and in the case that the first rotary wing module 2 and the second rotary wing module 3 move to a position where the first rotary wing module 2 and the second rotary wing module 3 are required to be fixed to the drone body 1, the first rotary wing module 2 and the drone body 1, or the second rotary wing module 3 and the drone body 1 may be manually or automatically tightly clamped.

Or the positioning may also be realized by other structures, and the arranged positions of the positioning members are not limited to the surfaces, facing towards each other, of the first rotary wing module 2 and the drone body 1, and the surfaces, facing towards each other, of the second rotary wing module 3 and the drone body 1. For example, the first rotary wing module 2 and the second rotary wing module 3 may be driven to rotate by form of a motor in cooperation with a gear, or a cam, or a be pulley, and a push rod, and in this case, a motor may be utilized to lock the push rod to any desired positions. The first rotary wing module 2 and the second rotary wing module 3 may also be configured as a self-lockable leaflet structure, to be fixed at a position where the first rotary wing module 2 and the second rotary wing module 3 are required to be positioned. Or, the articulating shafts 4 may also be improved, to achieve positioning by a friction force between the articulating shaft 4 and the first rotary wing module 2, and a friction force between the articulating shaft 4 and the second rotary wing module 3.

Apparently, the first rotary wing module 2 and the second rotary wing module 3 may employ the same structures to achieve positioning of the first rotary wing module 2 and the second rotary wing module 3 to the drone body 1, or may also employ different structures, or, only one of the first rotary wing module 2 and the second rotary wing module 3 employs a positioning structure to be fixed to the drone body 1.

Figure 3:
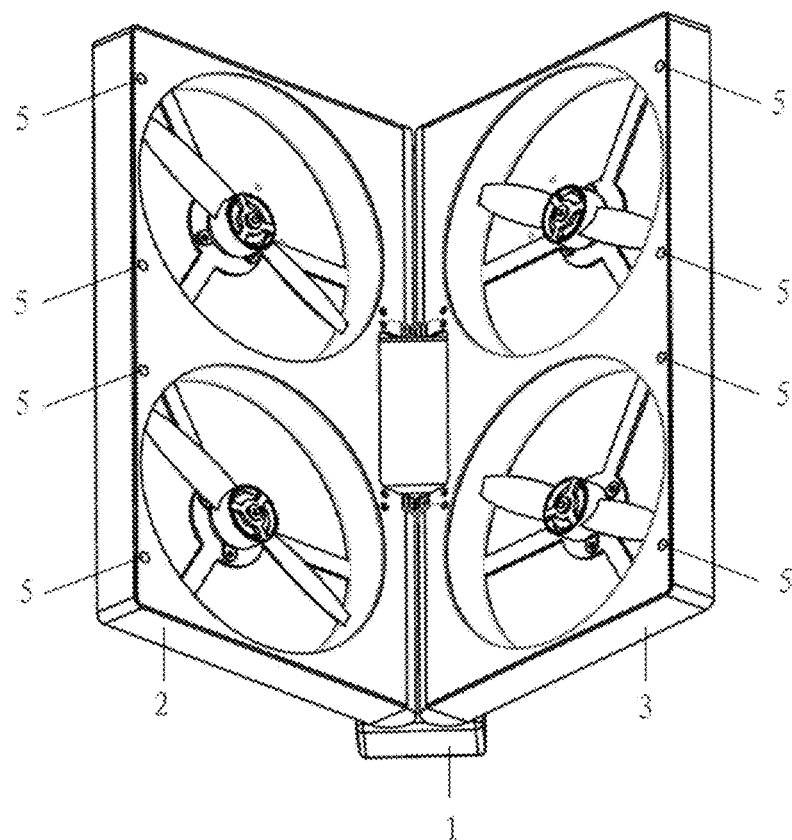
FIG. 3 is a front schematic view showing the structure of the foldable drone in FIG. 1 in the partially folded state.

Further, as shown in FIG. 3, first positioning members 5 in cooperation with each other may be provided on surfaces, facing towards each other, of the first rotary wing module 2 and the second rotary wing module 3 respectively, and the first rotary wing module 2 and the second rotary wing module 3 may be fixed to each other by the first positioning members 5 when being folded. The surfaces facing towards each other here refer to the inner surfaces of the two rotary wing modules. As shown in FIG. 3, the first positioning members 5 may also be magnets, and the magnets may be provided at positions, corresponding to each other, of the first rotary wing module 2 and the second rotary wing module 3, and the first rotary wing module 2 and the second rotary wing module 3 may be attracted by the magnets and thus are positioned when being folded. The number and positions of the magnets may be set as required by those skilled in the art. For example, for each of the two rotary wing modules, the magnets may be arranged at a side away from the articulating shafts 4, and a plurality of magnets may further be provided in an extending direction of this side at intervals, and the intervals may be equal to each other or may be adjusted as required. In the embodiment shown in FIG. 3, illustration is made taken four magnets provided as an example, and the magnets may be located at left and right sides of the inner surfaces respectively. The number and arranging positions of the magnets in the second positioning members 6 may also be set as required by those skilled in the art. The structural forms of the first positioning member 5 and the second positioning member 6 may be similar to each other, that is, those skilled in the art may arrange the first positioning member 5 by referring to the above description of the second positioning member 6, thus is not described in further detail hereinafter.

Figure 4:
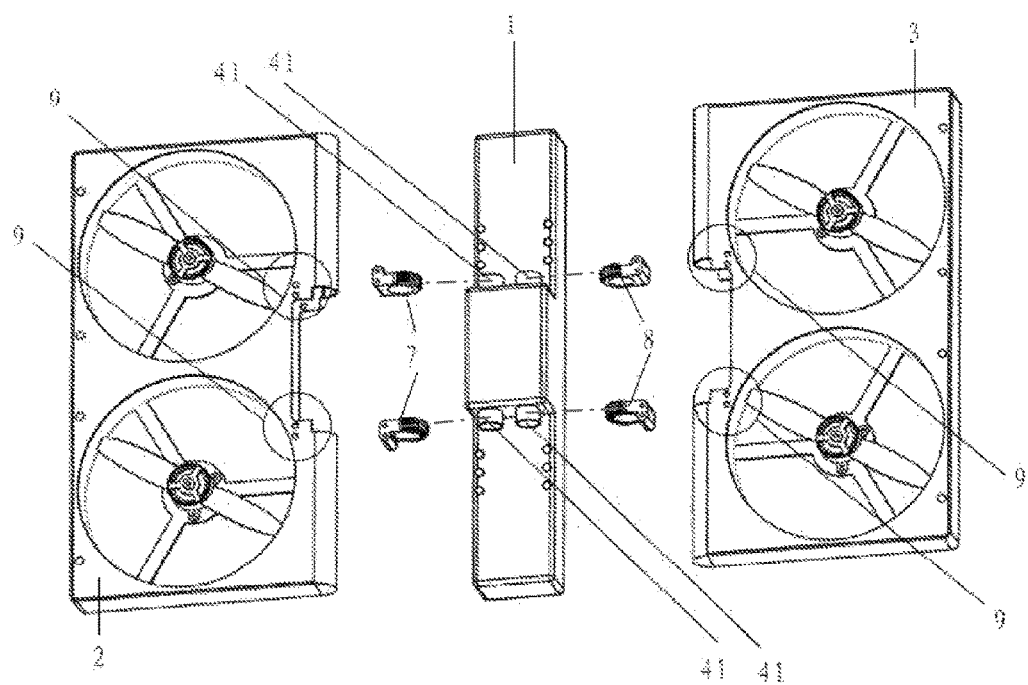
FIG. 4 is an exploded perspective view showing the assembling of the foldable drone in FIG. 1.

As shown in FIG. 4, the structures of first rotary wing module 2, the second module 3 and the drone body 1 may be specifically set by those skilled in the art. A vertical cross section of the drone body 1 (i.e., an inward and outward direction) may be of a T shape, and a vertical portion of the T shape may be configured to mount the articulating shafts 4. Each of the articulating shafts 4 may extend substantially along a direction in parallel with a transverse portion of the T-shape, and the articulating shafts 4 may extend from the vertical portion of the T shape to two ends along the transverse direction, namely, the front and rear direction in FIG. 4, and in this case, two ends of the articulating shaft 4 may form connecting ends 41. A front end and a rear end of the first rotary wing module 2 are respectively articulated to the connecting ends 41 of the articulating shaft 4 on the same side as the first rotary wing module 2, and the second rotary wing module 3 may also be articulated to the connecting ends 41 of the articulating shaft 4 on the same side as the second rotary wing module 3. It may be appreciated that, specifically, each of the articulating shafts 4 may run through the vertical portion of the T shape, or may also only include the connecting ends 41 arranged at two ends of the vertical portion, as long as the first rotary wing module 2 and the second rotary wing module 3 can form an articulation with the respective corresponding connecting ends 41, to rotate about the connecting ends 41. In this case, the connecting ends 41 at two ends are arranged coaxially, and the connecting line of the two connecting ends 41 is axis of the articulation shaft 4, and is equivalent to the articulating shaft 4.

A bottom surface of the T shape may be taken as the mounting surface; and the two articulating shafts 4 may be respectively arranged on two sides of the mounting surface, namely, the left side and right side shown in FIG. 4. No matter what kind of structure is employed, the first rotary wing module 2 and the second rotary wing module 3 may be allowed to parallel to and fit the transverse portion of the T shape after the first rotary wing module 2 and the second rotary wing module 3 are unfolded, as shown in FIG. 1.

Further, each of the first rotary wing module 2 and the second rotary wing module 3 may be arranged in a structure similar to a door plate, as shown in FIGS. 1 to 6. The following illustration is made by simply taking the structure of the first rotary wing module 2 as an example, and the second rotary wing module 3 may be configured by referring to the first rotary wing module 2. The first rotary wing module 2 may include a frame, and the frame may be configured as a structure similar to a door frame, and two mounting cavities for mounting the rotary wings are provided in the frame. Taking the first rotary wing module 2 arranged at the left side of the drone body 1 as an example, a U-shaped groove may be provided to a left side of the frame, and an opening of the U-shaped groove faces towards the articulating shaft 4 at the left side of the drone body 1 to receive the articulating shaft 4. As described above, in the case that the vertical cross section of the drone body 1 is of a T shape, the opening of the U-shaped groove may further receive the vertical portion of the T shape, thus further simplifying the structure. Two side walls of the U-shaped groove are connected to the two ends of the articulating shaft 4, to form an overall structure as shown in FIGS. 1 to 3.

Moreover, in the case that the first rotary wing module 2 and the second rotary wing module 3 are folded, the outer side surface of each of the first rotary wing module 2 and the second rotary wing module 3 may not be beyond a corresponding outer side surface of the drone body 1, i.e., the first rotary wing module 2 and each of the second rotary wing module 3 are located at a corresponding inner side of the drone body 1, to form a folded structure which has a small volume and is portable. In the embodiments shown in FIGS. 1 to 6, the outer side surfaces of the drone body 1 respectively refer to its left side surface and right side surface, i.e., the outer side surface of the first rotary wing module 2 at the left side is located at a right side of the left side surface of the drone body 1 or aligns to the left side surface of the drone body 1; and the outer side surface of the second rotary wing module 3 at the right side is located at a left side of the right side surface of the drone body 1 or aligns to the right side surface of the drone body 1. That is to say, when the drone is folded, the first rotary wing module 2 and the second rotary wing module 3 may be received to the inner sides of the drone body 1.

In the case that the structure in FIG. 4 is employed, the sides, close to the drone body 1, of the first rotary wing module 2 and the second rotary wing module 3 may each be provided with a U-shaped groove. In this case, the drone body 1 may extend into the U-shaped grooves at two sides. When being fold, the first rotary wing module 2 and the second rotary wing module 3 are respectively folded inward towards the corresponding U-shaped groove, and then the parts of the first rotary wing module 2 and the second rotary wing module 3 located at the outer sides of the drone body 1 are gradually received inward, and are eventually received to the inner sides of the drone body 1. In the embodiment shown in FIG. 4, the inner side of the drone body 1 is between the left side and the right side of the drone body 1, that is to say, the first rotary wing module 2 and the second rotary wing module 3 located at the left side and the right side may rotate towards the middle, and eventually, the both are folded to form a folded plate structure which is not beyond the left side and the right side of the drone body 1 in the left and right direction.

On this basis, the first rotary wing module 2 may also be provided with a first gear 7, and the second rotary wing module 2 may be provided with a second gear 8. The first gear 7 and the second gear 8 are engaged with each other, and axes of the first gear 7 and the second gear 8 are respectively in parallel with the respective articulating shafts 4 on the same sides as the first gear 7 and the second gear 8. Then when one of the rotary wing modules rotates about its articulating shaft 4, the gear connected to this rotary wing module is driven to rotate, and since two gears are engaged, if one of the gears rotates, the other gear may also rotate accordingly, thus the other rotary wing module is further driven to rotate. In other words, the arrangement of the first gear 7 and the second gear 8 may ensure the synchronousness in rotating of the first rotary wing module 2 and the second rotary wing module 2, and may further ensure that angles of the first rotary wing module 2 and the second rotary wing module 3 with respect to the drone body 1 always keep consistent in the folding and unfolding process, thereby improving the stability of the drone.

In addition, the first rotary wing module 2 may achieve an articulation with the drone body 1 by the first gear 7, similarly, the second rotary wing module 3 may also achieve articulation with the drone body 1 by the second gear 8. As shown in FIG. 4, the two articulating shafts 4 may be arranged in the drone body 1. The first gear 7 is sleeved on the articulating shaft 4 on the same side as the first gear 7, and the second gear 8 is respectively sleeved on the articulating shaft 4 on the same side as the second gear 8. The first gear 7 and the second gear 8 may each rotate with respect to the corresponding articulating shaft 4, and each of the first rotary wing module 2 and the second rotary wing module 3 achieves the articulation with the drone body 1 by the corresponding gear. The first gear 7 and the second gear 8 may be configured in a ring structure, and teeth engaged with each other may be arranged on outer rings of the ring structure, and inner rings may be directly sleeved on the corresponding articulating shafts 4. As described hereinbefore, each of the articulating shafts 4 may only include two connecting ends 41, and each of the two connecting ends 41 is equivalent to a short shaft, in this case, each of the connecting ends 41 may adopt a approximately sleeve-shaped structure, and then the first gear 7 and the second gear 8 may be sleeved on the respective sleeves. For improving the connecting reliability, each of the connecting ends 41 may achieve articulation by the form of gear. The number of the connecting ends 41 may also be set according to the number of the rotary wings by those skilled in the art.

Each of the first gear 7 and the second gear 8 may be integrally formed with the corresponding rotary wing module, or may be connected in detachable connection manners such as a threaded connection, a pin connection, or the like. As shown in FIG. 4, threaded holes 9 may be provided in the first rotary wing module 2 and the second rotary wing module 3, and corresponding threaded connecting holes may be provided in the first gear 7 and the second gear 8, thus the first gear 7 and the first rotary wing module 2 are connected by bolts, and the second gear 8 and the second rotary wing module 3 are also connected by bolts.

In the embodiment shown in FIGS. 1 to 4, each of the first rotary wing module 2 and the second rotary wing module 3 includes two rotary wings, and the two rotary wings may be integrally formed or connected to each other, to form a linear structure. Of course, the arrangement manner and the number of the rotary wings may be set as required by those skilled in the art.

Figure 5:
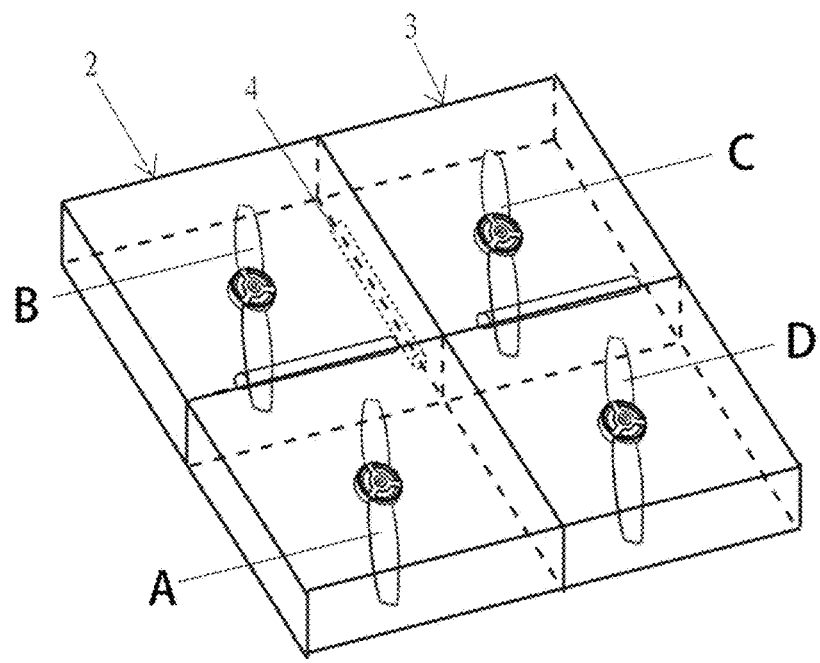
FIG. 5 is a perspective schematic view showing the structure of a foldable drone according to another embodiment of the present application in an unfolded state.
Figure 6:
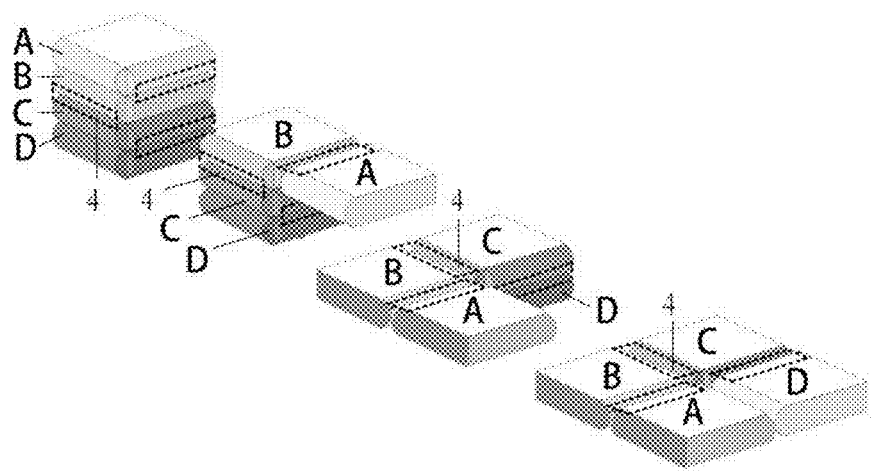
FIG. 6 is a schematic view showing an unfolding process of the drone in a folded state in FIG. 5.

Reference is further made to FIGS. 5 and 6, in the first rotary wing module 2 and the second rotary wing module 3 according to the present application, two adjacent rotary wings may be connected by articulation, i.e., for a single rotary wing module, in the case that more than two rotary wings are included, the rotary wings may also be connected by articulation. The first rotary wing module 2 and the second rotary wing module 3 each including two rotary wings are still taken as an example, the first rotary wing module 2 may include a rotary wing A and a rotary wing B, and the second rotary wing module 3 may include a rotary wing C and a rotary wing D. The rotary wing B and the rotary wing C may serve as basic rotary wings, and the rotary wing A and the rotary wing D may serve as folding rotary wings. The drone body 1 is arranged between the rotary wing B and the rotary wing C, and the rotary wing B and the rotary wing C are respectively articulated to two sides of the drone body 1, to realize the articulation of the first rotary wing module 2 and the second rotary wing module 3 to the drone body 1. For an easy description, folding in up and down directions in FIG. 6 is described. In the folding process, the rotary wing D may be turned downward to be folded beneath the rotary wing C, and then the rotary wing B is folded on the rotary wing C, and then the rotary wing A is turned upward to be folded on the rotary wing B, and thus forming the folded structure shown at the leftmost side in FIG. 6. The unfolding may be performed just in a reverse sequence.

Or, the rotary wing A may be folded on the rotary wing B first, and then the rotary wing D may be folded beneath the rotary wing C, and then the rotary wing B and the rotary wing C are folded, and the unfolding may be performed also just according to a reverse sequence.

In the case that more than two folding rotary wings are provided, the folding rotary wings may be folded to the basic rotary wing in sequence, or the folding rotary wings may be unfolded from the basic rotary wing in a reverse sequence. Moreover, the dashed line blocks in FIG. 6 represent the connecting shafts for articulation of the rotary wings.

It is to be noted that, for simplifying the structure here, the drone body 1 is not shown in FIGS. 5 and 6. Those skilled in the art may also omit the drone body 1 as desired, and articulate the rotary wings in sequence directly, and the articulation form may employ a structure similar to the articulating shafts 4 described above.

The foldable drone according to the present application is described in detail hereinbefore. The principle and the embodiments of the present application are illustrated herein by specific examples. The above description of examples is only intended to help the understanding of the core concept of the present application. It should be noted that, for those skilled in the art, a few of modifications and improvements may be made to the present application without departing from the principle of the present application, and these modifications and improvements are also deemed to fall into the scope of the present application defined by the claims.

What is claimed is:

1. A foldable drone, comprising:
a drone body and
a rotary wing part connected to the drone body,
wherein:
the rotary wing part comprises a first rotary wing module and a second rotary wing module, the first rotary wing module and the second rotary wing module each comprising at least two rotary wings connected to each other and arranged linearly;
in each of the first rotary wing module and the second rotary wing module, two rotary wings, which are adjacent, are articulated, one of the rotary wings constitutes a basic rotary wing, and other rotary wings constitute folding rotary wings;
the folding rotary wings are operable to sequentially fold and unfold, thereby transitioning between a folded wing configuration and an unfolded wing configuration, wherein, in the folded wing configuration, the folding rotary wings are folded onto the basic rotary wing;
the first rotary wing module and the second rotary wing module are respectively articulated to two sides of the drone body via the respective basic rotary wing, thereby enabling the first rotary wing module and the second rotary wing module to transition between a folded wing module configuration and an unfolded wing module configuration by rotating about respective articulating shafts; and
in the folded wing module configuration, outer side surfaces of the first rotary wing module and the second rotary wing module are both not beyond outer side surfaces of the drone body.

2. The foldable drone according to claim 1, wherein first positioning members in cooperation with each other are provided on surfaces, facing towards each other, of the first rotary wing module and the second rotary wing module, wherein the first rotary wing module and the second rotary wing module are fixed to each other by the first positioning members when the first rotary wing module and the second rotary wing module are in the folded wing module configuration.

3. The foldable drone according to claim 1, wherein second positioning members in cooperation with each other are provided on surfaces, facing towards each other, of the drone body and at least one of: the first rotary wing module and the second rotary wing module, respectively, wherein the first rotary wing module and the second rotary wing module are fixed to the drone body by the second positioning members when the first rotary wing module and the second rotary wing module are in the unfolded wing module configuration.

4. The foldable drone according to claim 1, wherein, in the unfolded wing module configuration, the first rotary wing module defines a first plane, and the second rotary wing module defines a second plane coplanar with the first plane.

5. The foldable drone according to claim 4, wherein:
a vertical cross section of the drone body is of a T shape comprising a first element and a second element, wherein:

the first element is substantially rectangular and defines a first element edge;

the second element is substantially rectangular and defines a second element central axis;

the second element extends outward from the first element edge; and the second element central axis is substantially perpendicular to the first element edge;

the articulating shafts extend from two ends of a second element portion of the T shape to form connecting ends configured to respectively connect the first rotary wing module or the second rotary wing module, wherein the second element portion comprises the second element; and in the unfolded wing module configuration, the first rotary wing module and the second rotary wing module are in parallel with and fit a transverse portion of the T shape.

6. The foldable drone according to claim 1, wherein the first rotary wing module is provided with a first gear, the second rotary wing module is provided with a second gear engaged with the first gear, and axes of the first gear and the second gear are respectively in parallel with the articulating shafts on the same sides as the first gear and the second gear.

7. The foldable drone according to claim 6, wherein the two articulating shafts are arranged on the drone body, and the first gear and the second gear are respectively sleeved on and articulated to the respective articulating shafts on the same sides as the first gear and the second gear.

8. The foldable drone according to claim 2, wherein the first rotary wing module is provided with a first gear, the second rotary wing module is provided with a second gear engaged with the first gear, and axes of the first gear and the second gear are respectively in parallel with the articulating shafts on the same sides as the first gear and the second gear.

9. The foldable drone according to claim 3, wherein the first rotary wing module is provided with a first gear, the second rotary wing module is provided with a second gear engaged with the first gear, and axes of the first gear and the second gear are respectively in parallel with the articulating shafts on the same sides as the first gear and the second gear.

10. The foldable drone according to claim 4, wherein the first rotary wing module is provided with a first gear, the second rotary wing module is provided with a second gear engaged with the first gear, and axes of the first gear and the second gear are respectively in parallel with the articulating shafts on the same sides as the first gear and the second gear.

11. The foldable drone according to claim 5, wherein the first rotary wing module is provided with a first gear, the second rotary wing module is provided with a second gear engaged with the first gear, and axes of the first gear and the second gear are respectively in parallel with the articulating shafts on the same sides as the first gear and the second gear.

12. The foldable drone according to claim 8, wherein the two articulating shafts are arranged on the drone body, and the first gear and the second gear are respectively sleeved on and articulated to the respective articulating shafts on the same sides as the first gear and the second gear.

13. The foldable drone according to claim 9, wherein the two articulating shafts are arranged on the drone body, and the first gear and the second gear are respectively sleeved on and articulated to the respective articulating shafts on the same sides as the first gear and the second gear.

14. The foldable drone according to claim 10, wherein the two articulating shafts are arranged on the drone body, and the first gear and the second gear are respectively sleeved on and articulated to the respective articulating shafts on the same sides as the first gear and the second gear.

15. The foldable drone according to claim 11, wherein the two articulating shafts are arranged on the drone body, and the first gear and the second gear are respectively sleeved on and articulated to the respective articulating shafts on the same sides as the first gear and the second gear.

16. The foldable drone according to claim 4, wherein, in the unfolded wing module configuration, the drone body defines a body plane coplanar with the first plane and the second plane.

17. The foldable drone according to claim 4, wherein, in the unfolded wing module configuration, a surface of the drone body is in parallel with the first plane and the second plane.

* * * * *